United States Patent Office 3,706,746
Patented Dec. 19, 1972

3,706,746
O-DESACETYL DERIVATIVES OF 7-N-ACYL-
AMINO-CEPHALOSPHORANIC ACIDS
Rolf Bosshardt, Arlesheim, Bruno Fechtig, Reinach,
Johannes Mueller, Arlesheim, Heinrich Peter, Riehen,
and Hans Bickel, Binningen, Switzerland, assignors to
Ciba-Geigy Corporation, Summit, N.J.
No Drawing. Filed Oct. 20, 1969, Ser. No. 867,863
Claims priority, application Switzerland, Nov. 7, 1968,
16,591/68; Apr. 25, 1969, 6,362/69
Int. Cl. C07d 99/24
U.S. Cl. 260—243 C               6 Claims

ABSTRACT OF THE DISCLOSURE

7-N-ocyl - O - desacetyl - O - N - substituted-carbamoyl-aminocephalosporanic acids in which acyl is the radical of a cyclically substituted lower alkanecarboxylic acid carrying a free amino group linked with a carbon atom of aliphatic character. Use: antibiotics.

The present invention is concerned with the manufacture of new O-desacetyl-7-N-acylamino-cephalosporanic acids of the formula (I)
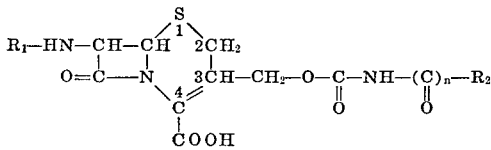

in which $R_1$ represents the acyl residue of a cyclically substituted lower alkanecarboxylic acid which contains a free amino group linked with a carbon atom of aliphatic character; $R_2$ represents a hydrogen atom or an unsubstituted or substituted hydrocarbon residue, and $n=0$ or 1, and of their possibly inner salts.

A cyclically substituted lower alkanecarboxylic acid of the formula $R_1$—OH is for example a corresponding formic, acetic, propionic, butyric, isobutyric, valeric, isovaleric, methylethylacetic, trimethylacetic or caproic acid, preferably acetic acid.

The cyclic substitutent of the lower alkanecarboxylic acid may be saturated or unsaturated and possess cycloaliphatic or aromatic properties; the cyclic carbon atoms of such a cyclic substituent may, if desired, be replaced by hetero atoms such as sulphur, oxygen or nitrogen atoms.

Cyclic substituents having cycloaliphatic properties are unsubstituted or substituted cycloaliphatic hydrocarbon residues which may contain 3–8, especially 5 or 6 ring carbon atoms, such as cycloalkyl, for example cyclopropyl, cyclobutyl, cyclopentyl, cyclohexyl, cycloheptyl, cyclooctyl, or cycloalkenyl, for example, 1-, 2-, or 3-cyclopentenyl, 1-, 2-, 3-cyclohexenyl, 1-, 2-, 3-, or 4-cycloheptenyl groups.

Cyclic substitutents having aromatic properties are, for example, unsubstituted or substituted mono-carbocyclic or mono-heterocyclic residues of aromatic character, such as phenyl, pyridyl, thienyl or furyl.

Substituents of the above-mentioned cyclic residues are lower alkyl, such as methyl, ethyl, propyl, isopropyl, n-butyl or tertiary butyl residues, lower alkoxy, for example methoxy, ethoxy, n-propyloxy or isopropyloxy groups, halogen atoms, for example fluorine, chlorine or bromine atoms or the pseudohalogen trifluoromethyl, and the nitro group.

The free amino group linked with an aliphatic carbon atom of the cyclically substituted lower alkanecarboxylic acid can substitute both a carbon atom of the lower alkanecarboxylic acid residue and that of a cyclic substituent having cycloaliphatic properties.

A possibly substituted hydrocarbon residue $R_2$ is an unsubstituted or halogen-substituted lower alkyl residue; the substituent is preferably in $\beta$ or $\gamma$-position.

The letter $n$ is in the first place 0, but it may also be 1.

The compounds of this invention may be in form of isomer mixtures, for example racemates or pure isomers, for example in form of the antipodes.

The new compounds display an outstanding, prolonged antibacterial activity against gram-positive, especially against gram-negative bacteria, for example against Staphylococcuc aureus (penicillin resistant), Escherichia coli, Klebsiella pneumoniae, Salmonella typhosa, Pseudomonas and Bacterium proteus as can be shown, for example in animal tests, for instance on mice in which the compounds of this invention display a chemotherapeutic action on subcutaneous, especially also oral, administration depending on the kind of bacterial infection, of a dose of about 0.001 to about 0.3 g./kg. The new compounds display also on oral administration an excellent action comparable to that achieved by subcutaneous administration.

The compounds of this invention can therefore be used as antibacterial drugs for treating infections caused by gram-positive or gram-negative, especially by the abovementioned microorganisms, also as additives to animal feedingstuffs, for preserving foodstuffs or as disinfectants.

The invention primarily relates to compounds of the Formula I, in which $R_1$ represents a cyclically substituted aminoacetic acid residue and $R_2$ an optionally chlorine-substituted lower alkyl residue, and $n$ stands for 0, as well as their possibly inner salts; these compounds display pronounced antibacterial activities of the kind mentioned above. These compounds, and in the first place the O-desacetyl - O - (N-$\beta$-chlorethylcarbamoyl) - 7 - N - ($\alpha$-amino-phenylacetyl)-amino-cephalosporanic acid, and the corresponding O-desacetyl-O-(N-methylcarbamoyl)- and O-desacetyl-O-(N-ethylcarbamoyl) compound and the possibly inner salts of such compounds display in the animal test, for example on mice, on subcutaneous and especially oral administration in doses of about 0.001 g./kg. to 0.3 g./kg. excellent antibacterial action of prolonged duration against the abovementioned, especially gram-negative and also gram-positive microorganisms.

The compounds of the present invention are accessible by known methods; for example, they are obtained when in compounds of the formula (II)
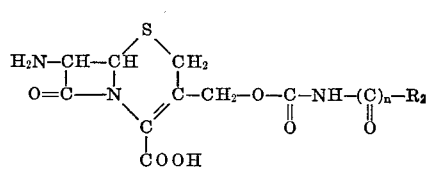

the acyl residue $R_1$ is introduced into the 7-amino group.

The above reaction may be carried out in known manner, especially in the manner suitable for acylating weakly basic amino groups by aminoacids, for example by reacting the starting material of the Formula II with an acid addition salt, especially with the salt of a hydrohalic acid, for example hydrochloric acid, or of an acid halide, especially chloride, of an acid of the formula $R_1$—OH. The desired compound of the Formula I is also obtained by treating a starting material of the Formula II with an N-carboxyanhydride (Leuch's anhydride) of an acid of the formula $R_1$—OH, especially one in which the free amino group is in $\alpha$-position to the carboxyl group.

The compounds of the present invention are also obtained when in compounds of the Formula I

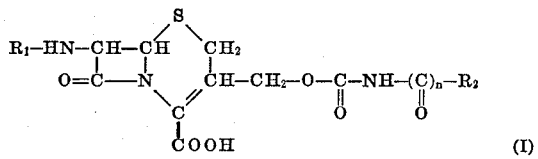

(I)

in which $R_1$ has the meaning indicated and wherein the free amino group in $R_1$ and/or the 4-carboxy group is/are protected, the protective group(s) is/are split off and, if desired, a resulting free compound is converted into a salt or a resulting salt into the free compound or into another salt, and/or if desired, resulting mixtures of isomers are resolved into the individual isomers.

A protected amino group is in the first place an N-acyl-amino group in which the acyl residue is easy to split off and is primarily the acyl residue of a semi-ester of carbonic acid which is advantageously eliminable under acid or reductive, as well as photolytic conditions. Residues of this kind that are eliminable under acid conditions, for example on treatment with a strong organic carboxylic acid, such as a halogen-lower alkanecarboxylic acid, primarily trifluoracetic acid, are for example carbo-lower alkoxy residues in which lower alkyl represents a lower alkyl group which is poly-branched in α-position and/or which contains in α-position cyclic substituents of aromatic character, such as aromatic groups, for example phenyl, as also biphenylyl, for example 4-biphenylyl residues or heterocyclic groups of aromatic character, for example 2-furyl residues, especially the carbo-tertiary butyloxy, or the carbo-tertiary pentyloxy residue, the carbo-diphenylmethoxy, the carbo-2-(4-biphenylyl)-2-propyloxy residue, the carbo-1,1-diphenylethoxy or the carbo-2-furfuryloxy residue, and carbo-cycloalkoxy residues in which cycloalkyl preferably represents a polycyclic cycloalkyl group, especially the carboadamantyloxy residue.

Acyl residues of semi-esters of carbonic acid that can be eliminated under reducing conditions, for example by treatment with hydrogen catalytically activated with metal, for instance nickel or palladium catalysts, or nascent hydrogen as it is obtained, for example, by the reaction of metals, for example zinc, or metal alloys or amalgams or salts such as cobalt-II-acetate, upon suitable hydrogen donors, such as acids, especially lower alkanecarboxylic acids, in the first place acetic acid, or alcohols such as lower alkanols, are for instance carbo-lower alkoxy residues whose lower alkyl residue is substituted in α-position by aromatic groups, especially phenyl groups, on in the β-position by halogen, especially chlorine atoms, more especially the carbo-2,2,2-trichlorethoxy, carbo-2-iodethoxy or carbobenzyloxy residue.

Carbo-lower alkoxy groups in which the lower alkyl residue contains in position α a lower alkoxy for instance methoxy-substituted phenyl, especially an m-lower alkoxy, for example m-methoxyphenyl group, preferably the 3,5-dimethoxyphenyl group, can alternatively be eliminated in known manner photolytically, for example by irradiation with ultraviolet light, preferably emitted by a high-pressure mercury vapour lamp.

Further amino protective groups are for example polyarylmethyl groups in which aryl preferably stands for an optionally substituted phenyl group, especially the trityl group. Such groups can be eliminated in per se conventional manner by treatment with suitable acid agents, such as a strong inorganic acid, for example hydrochloric acid or with an organic acid, for example formic of acetic acid.

Furthermore, azido and nitro groups can be converted into the free amino group by reduction in known manner, for example by treatment with hydrogen activated catalytically, as with a palladium catalyst, or with nascent hydrogen.

A protected 4-carboxy group is for example an esterified carboxyl or acyloxy carbonyl group which is easy to convert into the carboxyl group, in the first place by reduction or under acid or neutral or mild alkaline conditions.

Reductive conversion into the free carboxyl group, for example by treatment with nascent hydrogen, is suitable, for example, for certain esterified carboxyl groups, especially carbo-lower alkoxy groups in which the lower alkyl radical contains in β-position halogen, especially chlorine atoms, and more especially the carbo-2,2,2-trichlorethoxy and carbo-2-iodethoxy group; they can be converted into the free carboxyl group in known manner, preferably by treatment with nascent hydrogen, under acid or neutral conditions, for example with zinc in the presence of a suitable lower alkanecarboxylic acid, such as acetic acid, especially slightly dilute acetic acid of, for example, 90% strength, or with a strongly reducing metal salt, such as cobalt-II-acetate, in the presence of an aqueous medium.

A carbo-lower alkoxy group, in which lower alkyl in α-position is polybranched and/or contains in α-position residues of aromatic character, such as possibly substituted aromatic hydrocarbon groups, for example phenyl residues or heterocyclic groups of aromatic character such as the 2-furyl group, for example the carbo-tertiary butoxy, carbo-tertiary pentoxy, carbo-diphenylmethoxy, carbo-2-furfuryloxy, carbo-cycloalkoxy group, in which cycloalkyl is a polycyclic residue such as the carbo-adamantyloxy group, can be converted into the free carboxyl group by treatment with an appropriate acidic agent, such as a strong organic carboxylic acid, preferably a halogen-containing lower alkanecarboxylic acid, in the first place trifluoroacetic acid.

Esterified carboxy groups that are easy to convert under mild conditions into the free carboxyl groups are also silylated and stannylated carboxyl groups. These are groups which are formed when compounds containing a free carboxyl group as well as their salts such as alkali metal salts, for example sodium salts thereof, are treated with a suitable silylating agent such as tri-lower alkyl-silyl halide, for example trimethylsilylchloride, or an N-(tri-lower alkyl-silyl)-N-$R_a$-N-$R_b$-amine (in which $R_a$ represents a hydrogen atom or a lower alkyl group and $R_b$ a hydrogen atom, a lower alkyl group or a tri-lower alkyl-silyl group; see for instance British specification No. 1,073,530) or with a suitable stannylating agent such as bis-(tri-lower alkyl-tin)oxide, for example bis-(tri-n-butyl-tin oxide, a tri-lower alkyl tin hydroxide, for example triethyl-tin hydroxide, a tri-lower alkyl-lower alkoxy-tin, tetra-lower alkoxy-tin or tetra-lower alkyl-tin compound, or a tri-lower alkyl-tin halide, for example tri-n-butyl-tin chloride (see for instance Netherlands Auslegeschrift 67/17,107). The above-named starting materials containing silylated and stannylated carboxyl groups can be converted into the desired compounds containing a free carboxyl group, for example, by treatment with a (preferably neutral) hydrogen donor, especially water or an alcohol such as a lower alkanol, for example ethanol.

In an acyloxy-carbonyl group acyl is the residue of a carboxylic acid, preferably an aliphatic carboxylic acid, for example a lower alkanoyl or especially the acetyl residue. Such an acyloxycarbonyl group can be converted into the free carboxyl group by hydrolysis, if necessary under mild alkaline conditions, for example in a suitable buffer solution, such as a weakly basic phosphate buffer solution.

A salt obtained according to this invention can be converted into the free compound, and a free compound obtained according to this invention can be converted into salt. Salts are in the first place pharmaceutically acceptable salts as well as salts that are suitable for isolating, purifying and/or marking purposes, for example salts with bases or with acids, as well as inner salts. Salts with bases are in the first place metal salts, especially alkali metal salts, for example sodium or potassium salts, or alkaline earth metal salts, for example magnesium or calcium salts, or ammonium salts, including ammonium salts with organic bases such as tri-lower alkyl-amines, for example trimethylamine or triethylamine, or N-lower alkyl-azacycloalkanes, for example 1-methyl-pyrrolidine or 1-ethyl-piperidine, also dibenzylethylenediamine or procaine. They are obtained, for example, by treating the free compounds or inner salts with the basic compounds, as desired with the aid of an ion exchange resin.

Acid addition salts are in the first place those with strong inorganic acids, such as hydrochloric, hydrobromic or sulphuric acid, or with strong organic acids such as strong organic sulphonic acids, for example methanesulphonic, 2-hydroxyethanesulphonic or p-toluenesulphonic acid, or with a strong organic carboxylic acid, for example trifluoroacetic acid. They can be obtained, for example, by treating the free compounds with the appropriate strong acids, if desired with the aid of an ion exchange resin.

Inner salts, which appear as hybrid ions, are obtained by treating an acid addition salt with an appropriate, weakly basic ion exchange resin, or by titrating with a base up to the isoelectric point, or from a salt with a base by treatment with an acid.

In view of the close relationship between the new compounds in free form and in form of their salts, what has been said above and hereinafter with reference to the free compounds and the salts concerns also the corresponding salts and free compounds respectively, wherever possible and useful.

Isomer mixtures, such as racemates, obtained by the present process can be resolved in known manner into the individual isomers, such as antipodes (the latter for instance with the use of mixtures of diastereoisomeric salts).

The compounds of this invention are manufactured in the absence or presence of diluents or solvents or mixtures thereof, if desired in the presence of a condensing agent and/or catalyst, if necessary with cooling or heating and/or under superatmospheric pressure and/or in an inert gas, for example under nitrogen.

The invention includes also any variant of the present process in which an intermediate obtained at any stage of the process is used as starting material and any remaining step(s) is/are carried out or the process is discontinued at any stage thereof, or in which the starting material is formed under the reaction conditions or the reactants may be used in form of derivatives, such as salts, thereof.

Preferred starting materials and reaction conditions are those which give rise to the specially emphasized compounds described above.

The starting materials to be used in the present process can be prepared in known manner. Thus, starting materials of the Formula II are obtained when, for example, a 7-N-acylamino-cephalosporanic acid whose acyl group is an easily eliminable acyl residue, such as one of those mentioned above, for example the carbo-tertiary butoxy group, or preferably a salt, for example an alkali metal or ammonium salt thereof, is treated with an aqueous acetyl esterase solution [prepared. for example by fermenting *Bacillus subtilis*, isolating the cell material, digesting the latter in a suitable salt solution and purifying the solution containing the enzyme on a suitable adsorbent] at a pH value of about 7.3; the resulting O-desacetyl-7-N-acylaminocephalosporanic acid compound is treated with a suitable derivative of a (possibly N-substituted) carbamic acid, especially an inner anhydride that is to say an isocyanate or salt thereof and from the resulting O - desacetyl-O-carbamyl-7-N-acylamino-cephalosporanic acid compound the readily eliminable acyl group is eliminated a carbo-tertiary butoxy group for instance by treatment with trifluoroacetic acid.

A starting material of the Formula I is accessible by acylation of a starting material of the Formula II with an amino-protected acid of the Formula $R_1$—OH or with a derivative thereof by the method described above or by acylating 7-amino-cephalosporanic acid or a suitable derivative thereof, such as a silylation or stannylation product thereof, with such an acid or a derivative, followed by enzymatic elimination of the acetyl group with the aid of acetyl esterase by the above described method and treatment of the resulting compound with an appropriate carbamic acid derivative, such as an isocyanate, in the given case after having converted a silylated or stannylated product into the free acid.

A starting material of the Formula I with a protected 4-carboxyl group and possibly protected amino group can be formed for example by acylating the amino group in a corresponding acid derivative, especially in an ester or anhydride of O-desacetyl - O - carbamoyl-7-amino-cephalosporanic acid, which ester or anhydride can be converted into the free acid, especially under reducing, acidic, neutral or weakly alkaline conditions, for example by the process described above with a possibly amino-protected acid of the formula $R_1$—OH or with a derivative of such acid; or in a corresponding acid derivative of a possibly amino-protected 7-N-$R_1$-aminocephalosporanic acid the acetyl group is eliminated enzymatically and replaced by a carbamoyl group as described, and the amino-protective group is eliminated.

The desired starting materials are also obtained when an O-desacetyl-7-N-acylamino-isocephalosporanic acid, in which acyl is the amino-protected radical of the formula $R_1$ or an easily eliminable acyl residue, for example the carbo-tertiary butyloxy residue, or preferably an acid derivative thereof is treated with a carbamic acid of the formula HO—C(=O)—NH—[C(=O)]$n$—$R_2$, preferably with a reactive derivative thereof, such as an appropriate isocyanate, and, in any desired sequence, in a compound thus obtained an acyl group other than the acyl residue $R_1$ is converted in known manner into the acyl group $R_1$, and a free carboxyl group is protected, for example by esterification, and the resulting O-desacetyl-O-carbamoyl-7 - N - acyl - amino - cephalosporanic acid derivative is isomerized.

The isomerization may be carried out in known manner, for example by treatment with a weakly basic reagent, for example on organic nitrogenous base, especially a tertiary heterocyclic base of aromatic character, in the first place a base of the pyridine type, such as pyridine itself, or in a picoline, collidine or lutidine, or in a tertiary aromatic base, for example of the aniline type such as dimethylaniline or diethylaniline, or a tertiary aliphatic, azacycloaliphatic or araliphatic base such as triethylamine diisoproply-ethylamine, N-methylpiperidine or benzyldimethylamine. Further suitable are inorganic or organic salts of bases, especially of medium strong to strong bases with weak acids, such as sodium acetate, triethyl ammonium acetic or N-methylpiperidine acetate or other analogous bases.

The new compounds can be used as medicaments, for example in form of pharmaceutical preparations which contain the new compounds in conjunction or admixture with an organic or inorganic, solid or liquid pharmaceutical excipient suitable for enteral, local or parenteral administration. Suitable excipients are substances that do not react with the new compounds, for example water, gelatin, sugars such as lactose or glucose, starches such as corn, wheat, rice or arrowroot starch, stearyl alcohol, stearic acid, stearates such as calcium or magnesium stearate, talcum, vegetable oils, benzyl alcohols, gums, propyleneglycols, polyalkyleneglycols, white petroleum jelly or other known medicinal excipients. The pharmaceutical preparations may be in solid form, for example tablets, dragees, capsules, or suppositories, or in liquid form, for example, solutions, suspensions or emulsions, or ointments or creams. They may be sterilized and/or contain assistants such as preserving, stabilizing, wetting or emulsifying agents, solubilizers, salts for regulating the osmotic pressure or buffers. The preparations, which may also contain further therapeutically valuable substances, are formulated in known manner.

The following examples illustrate the invention. In the examples "MIC" means the minimum inhibitory concentration which is measured by the gradient plate test described in "Antibiotics," vol. I by Gottliev and Spaw, New York, 1967, page 508. The MIC is determined on strains of *Escherichia coli* 2018. *Klebsielly pneumonial* and *Salmonella typhimurium*.

EXAMPLE 1

0.57 grams (1 mmol) of O-desacetyl-O-(N-β-chloroethyl - carbamyl) - 7-N-[N-carbo-tertiary butoxy-D(—)-α-phenylglycyl]-aminocephalosporanic acid is dissolved with thorough stirring at 5° C. in 1.91 ml. (25 mmols) of trifluoroacetic acid. When the evolution of gases ceases (namely after about 3 minutes' reaction) the solution is poured into 30 ml. of cooled ether and the voluminous, amorphous precipitate is separated on a centrifuge, washed four times with fresh ether and dried under a high vacuum, to yield O-desacetyl-O-(N-β-chlorethyl-carbamyl)-7-N-[D(—)-α - phenylglycyl] - aminocephalosporanic acid trifluoroacetate which reveals an R$f$ value of 0.08 in the thin-layer chromatogram on silica gel (developed with iodine vapour) in the system ethyl acetate+pyridine+glacial acetic acid+water (62:21:6:11) and in the system n-butanol+glacial acetic acid+water (67:10:23) and R$f$ value of 0.24.

A solution of 0.1 g. (0.173 mmol) of O-desacetyl-O-(N-β-chlorethyl-carbamyl) - 7 - N - [D-(—)-α-phenyl-glycyl]-aminocephalosporanic acid trifluoroacetate in 0.4 ml. (0.2 mmol) of 0.5 N-aqueous hydrochloric acid is washed with 3× 1 ml. of ethyl acetate, and the organic solutions are once backwashed with 1 ml. of water and discarded. The combined aqueous solutions are adjusted to a pH value of 4.6 (isoelectric point) with 2 N-aqueous sodium carbonate solution and the crystalline material suspended in the solution is filtered off and washed with a minimum of water. The resulting product is O-desacetyl-O-(N-β-chlorethyl-carbamyl) - 7 - N - D - (—)-α-phenyl-glycyl]-amino-cephalosporanic acid as inner salt of the formula

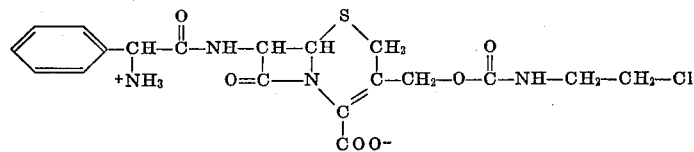

In the thin-layer chromatogram (on silica gel) the hybrid ion reveals an R$f$ value of 0.08 in the system ethyl acetate+pyridine+glacial acetic acid+water (62:21:6:11) and an R$f$ value of 0.24 in the system n-butanol+glacial acetic acid+water (67:10:23). Ultraviolet absorption spectrum (in 0.1 N-aqueous sodium bicarbonate sodution): $\lambda_{max}$ 258 m.: (=8050). Infrared absorption spectrum (in Nujol): characteristic bands at 3.13, 5.62, 5.69, 5.85, 5.91, 6.20, 6.45, 6.60, 7.40, 7.78, 7.98, 8.42, 8.78, 9.35, 9.67, 10.30, 12.27, 12.97 and 14.43$\mu$. MIC: *E. coli* 2018=3γ/ml.; *Kl. pneum.* =2γ/ml.; *Salm. typh.* =3γ/ml.

The starting material used above may be prepared thus:

10 grams (40 mmols) of N-carbo-tertiary butoxy-D-(—)-α-phenylglycine and 5.6 ml. (40 mmols) of triethylamine are dissolved in 100 ml. of absolute methylenechloride, the whole is cooled to —10° C. and 3.84 ml. (40 mmols) of chloroformic acid ethyl ester are added. Within 15 minutes the temperature is raised to 0° C., thus maintained for 30 minutes and then the batch is cooled to —50° C. Within 20 minutes a solution of 10.9 g. (40 mmols) of 7-aminocephalosporanic acid and 16.8 ml. (120 mmols) of triethylamine in 100 ml. of absolute methylenechloride is dropped in and the whole is kept for another hour at —50° C. and then for 2 hours at room temperature. The reaction mixture is poured into a mixture of 100 ml. of a 10% aqueous dibasic potassium phosphate solution and 100 ml. of a 10% monobasic potassium phosphate solution. The methylenechloride is expelled under reduced pressure; ethyl acetate is added and the aqueous phase is adjusted to a pH value of 2.6 with 20% aqueous phosphoric acid. The whole is extracted with 3× 200 ml. of ethyl acetate. The organic extract is washed with 3× 20 ml. of water and once with 50 ml. of a saturated aqueous sodium chloride solution, dried over sodium sulphate and evaporated. The residue is extracted with a mixture of 500 ml. of ether and 100 ml. of petroleum ether, to remove the excess of N-carbo-tertiary butoxy-D(—)-α-phenylglycine. The residue is dissolved in 10 ml. of ethyl acetate and 40 ml. of benzene and chromatographed on 250 g. of silica gel. The column (diameter 5.1 cm.) is prepared in an 8:2-mixture of benzene and ethyl acetate and eluated with 7:3-mixture of the same solvents. The resulting 7-N-[N-carbotertiary butoxy-D(—)-α-phenylglycyl]-aminocephalosporanic acid reveals in the thin-layer chromatogram an R$f$ value of 0.59 in the system ethyl acetate+pyridine+glacial acetic acid:water (62:21:6:11) and of 0.47 in the system n-butanol:glacial acetic acid+water (67:10:23).

A suspension of 1 g. (2 mmols) of 7-N-[N-carbotertiary butoxy-D(—)-α-phenylglycyl]aminocephalosporanic acid in 80 ml. of distilled water is caused to dissolve by adding 20 ml. of 0.1 N-aqueous sodium hydroxide (2 mmols). The solution is mixed with 0.05 g. of acetyl esterase obtained from *Bacillus subtilis* ATCC 6633 (cf. British Pat. No. 1,080,903) and stirred for 2 hours at 37° C. while keeping the pH value constant at 7.3. The acetic acid liberated by the enzymatic scission is neutralized with 20 ml. of 0.1 N-aqueous sodium hydroxide solution, on completion of the hydrolysis the solution is filtered through a diatomaceous earth product and the filtrate is lyophilized. The resulting sodium salt of O-desacetyl-7-N-[N-carbo-tertiary butoxy-D(—)-α-phenyl-glycyl]-aminocephalosporanic acid reveals in the thin-layer chromatogram on silica gel (developed with iodine vapour) an R$f$ value of 0.37 in the system ethyl acetate+pyridine+glacial acetic acid+water (62:21:6:11) and of 0.38 in the system n-butanol+glacial acetic acid+water (67:10:23).

A solution of 2.27 g. (4 mmols) of the crude lyophilisate, containing sodium acetate, of O-desacetyl-7-N-[N - carbo-tertiary butoxy-D(—)-α-phenylglycyl]-amino-cephalosporanic acid sodium salt in 20 ml. of absolute and degassed dimethylformamide, containing 5.6 ml. (40 mmols) of absolute triethylamine, is mixed with 3.36 ml. (40 mmols) of β-chlorethylisocyanate. The solution is agitated for 30 minutes at 25° C. and evaporated to dryness under a high vacuum, and the residue is digested with 3× 100 ml. of ether. The phase that is insoluble in ether is taken up in 50 ml. of a 10% aqueous phosphate buffer (pH-6.7), adjusted to pH-2.5 with ethyl acetate and extracted with 3× 200 ml. of ethyl acetate. The combined organic extracts are washed with water and with saturated aqueous sodium chloride solution, dried over sodium sulphate and evaporated under vacuum. The residue is chromatographed on 30 times its own weight of silica gel (0.05–0.2 mm. grain). Elution is carried out with a 6:4-mixture of benzene and ethyl acetate and gives the pure O-desacetyl - O - (N-β-chlorethylcarbamyl)-7-N-

[N-carbo-tertiary butoxy - D(—)-α-phenylglycyl]-aminocephalosporanic acid which reveals in the thin-layer chromatogram on silica gel an Rƒ value of 0.63 in the system ethyl acetate+pyridine+glacial acetic acid+water (62:21:6:11) and of 0.50 in the system n-butanol+glacial acetic acid+water (67:10:23).

EXAMPLE 2

At 5° C., 0.50 g. of O-desacetyl-O-(N-methyl-carbamoyl) - 7 - N - [N-carbo-tertiary-butyloxy-D(—)-α-phenylglycyl]-amino-cephalosporanic acid are dissolved in 2.0 ml. of trifluoracetic acid while stirring well. When the evolution of gas has ceased (i.e. after a reaction period of about 3 minutes), the batch is poured into 30 ml. of cooled ether, and the voluminous, amorphous precipitate is centrifuged off, washed four times with fresh ether, and dried in a high vacuum. O-desacetyl-O-(N-methyl-carbamoyl) - 7 - N - [D(—)-α-phenylglycyl]-amino-cephalosporanic acid trifluoroacetate is thus obtained which in the thin-layer chromatogram on silica gel (developed with iodine vapor) in the system ethyl acetate:pyridine:glacial acetic acid:water (62:21:6:11) has an Rƒ value of 0.05 and in the system n-butanol:glacial acetic acid:water (67:10:23) an Rƒ value of 0.13.

1.66 g. (3.1 mmols) of O-desacetyl-O-(N-methylcarbamoyl) - 7 - N[D(—) - α - phenylglycyl]-amino-cephalosporanic acid-trifluoracetate are dissolved in 40 ml. of methanol and 40 ml. of water, and the pH of the solution adjusted to 4.5 with an 0.1 N, 50% methanolic sodium hydroxide solution. Ethanol is added and the solution evaporated to dryness. The residue is digested 10 times with 5 ml. of alcohol each time, dissolved in 40 ml. of methanol and 40 ml. of water, and treated with 400 mg. of Norit SX–LF. The solution is filtered through "Hyflo," the methanol expelled under a high vacuum, and the aqueous solution then lyophilized. O-desacetyl-O-(N-methyl-carbamoyl - 7 - N - [D(—) - α-phenylglycyl]-amino-cephalosporanic acid is obtained as an inner salt, as in Example 1. In the thin-layer chromatogram (on silica gel), the hybrid ion has an Rƒ value of 0.05 in the system ethyl acetate:pyridine:glacial acetic acid:water (62:21:6:11) and an Rƒ value of 0.13 in the system N-butanol:glacial acetic acid:water (67:10:23); ultraviolet absorption spectrum (in water):

$\lambda_{max}$ 260 mμ ($\epsilon$=7,900); infrared absorption spectrum (in Nujol): characteristic bands at 3.08, 5.65, 5.91, 6.24, 6.42, 7.93, 8.85, 9.36, 9.72, 10.33, 12.26μ MIC: E coli 2018=3γ/ml.; Kl. pneum.=4γ/ml.; Salm. typh.=3γ/ml.

The O - desacetyl - O - (N-methyl-carbamoyl)-7-N-[N-carbo-tertiary butyloxy-D(—) - α - phenylglycyl]-aminocephalosporanic acid used as starting material can be prepared as follows:

A solution of 11.3 g. (20 mmols) of the crude lyophilisate of the sodium salt of O-desacetyl-7-N-[N-carbotertiary butyloxy-D-(—) - α - phenylglycyl]-amino-cephalosporanic acid containing sodium acetate (cf. Example 1) in 200 ml. of absolute, degassed dimethylformamide, containing 28 ml. (200 mmols) of absolute triethylamine is treated with 11.8 ml. (200 mmols) of methyl isocyanate. The mixture is shaken at 25° C. for 30 minutes and then evaporated to dryness in a high vacuum. The residue is dissolved in 600 ml. of a 10% aqueous phosphate buffer (pH 6.7), given a pH of 2.5 by adding ethyl acetate, and extracted with 300 ml. of ethyl acetate. The combined organic extracts are washed with water and saturated aqueous sodium chloride solution, dried over sodium sulfate, and evaporated under reduced pressure. The residue is chromatographed over the 30-fold quantity of silica gel (0.05–0.2 mm. grain size). Elution is performed with a 1:1 mixture of benzene and ethyl acetate, and pure O-desacetyl-O-(N-methyl-carbamoyl) - 7 - N - [N-carbotertiary butyloxy-D(—)-α-phenylglycyl] - amino - cephalosporanic acid obtained which in the thin-layer chromatogram on silica gel displays an Rƒ value of 0.50 in the system ethyl acetate:pyridine:glacial acetic acid:water (62:21:6:11) and an Rƒ value of 0.50 in the system n-butanol-glacial acetic acid:water (67:10:23).

At 5° C. and with good stirring, 0.50 g. of O-desacetyl-O-(N - ethyl - carbamoyl) - 7 - N - [N - carbo - tertiary butoxy-D(—)-α-phenylglycyl] - amino - cephalosporanic acid are dissolved in 2.0 ml. of trifluoroacetic acid. When the evolution of gas ceases (i.e. after a reaction period of about 3 minutes), the batch is poured into 30 ml. of cooled ether, and the voluminous, amorphous precipitate is centrifuged off, washed four times with fresh ether, and dried in a high vacuum. In this manner, O-desacetyl-O-(N - ethyl - carbamoyl) - 7 - N - [D(—)-α-phenylglycyl]-amino-cephalosporanic acid-trifluoracetate is obtained which in the thin-layer chromatogram on silica gel (developed with iodine vapor) displays an Rƒ value of 0.07 in the system ethyl acetate:pyridine:glycial acetic acid:water (62:21:6:11), and of 0.18 in the system n-butanol:glacial acetic acid:water (67:10:23).

3.10 g. (5.6 mmols) of O-desacetyl - O - (N-ethyl-carbamoyl) - 7 - N - [D(—) - α - phenylglycyl] - aminocephalosporanic acid-trifluoracetate are dissolved in 80 ml. of methanol and 80 ml. of water and adjusted to pH 4.3 with an 0.1 N 50% methanolic sodium hydroxide solution. The solution is freed from methanol in a high vacuum, and lyophilized. The residue is digested with 4× 30 ml. of ethyl acetate and 8× 15 ml. of alcohol, then dissolved in 30 ml. of methanol and 30 ml. of water, and the solution treated with 400 mg. of Norit SX–LF. After filtration through "Hyflo" and elimination of the methanol, the aqueous solution is lyophilized. O-desacetyl-O-(N-ethyl-carbamoyl) - 7 - N-[D(—)-α-phenylglycyl]-aminocephalosporanic acid is obtained as an inner salt, as in Example 1. In the thin-layer chromatogram on silica gel the hybrid ion shows an Rƒ value of 0.07 in the system ethyl acetate:pyridine:glacial acetic acid:water (62:21:6:11), and an Rƒ value of 0.18 in the system n-butanol:glacial acetic acid:water (67:10:23); ultraviolet absorption spectrum (in water); $\lambda_{max}$ 261 mμ ($\epsilon$=7800); infrared absorption spectrum (in Nujol): characteristic bands at 3.10, 5.63, 5.90, 6.23, 7.98, 9.00, 9.32, 9.68, 12.25 and 14.4μ. MIC: E. coli 2018=2.5γ/ml.; Kl. pneum.=3.5γ/ml.; Salm. typh.=5.5γ/ml.

The O-desacetyl-O-(N - ethyl - carbamoyl) - 7 -N- [N-carbo-tertiary butyloxy-D(—) - α - phenylglycyl]-aminocephalosporanic acid used as starting material can be prepared as follows:

A solution of 19.8 g. (35 mmols) of the crude lyophilisate of the sodium salt of O-desacetyl-7-N-[N-carbotertiary butyloxy - D(—) - α - phenylglycyl] - aminocephalosporanic acid containing sodium acetate in 300 ml. of absolute, degassed dimethylformamide, containing 49 ml. (350 mmols) of absolute triethylamine is treated with 27.7 ml. (350 mmols) of ethylisocyanate. The mixture is shaken at 25° C. for 30 minutes and then evaporated to dryness in a high vacuum. The residue is dissolved in 600 ml. of a 10% aqueous phosphate buffer (pH 6.7), given a pH of 2.5 with ethyl acetate, and extracted with 300 ml. of ethyl acetate. The combined organic extracts are washed with water and saturated aqueous sodium chloride solutions, dried over sodium sulfate, and evaporated under reduced pressure. The residue is chromatographed over the 30-fold quantity of silica gel (0.05–0.2 mm. grain size). Elution is preformed with a 6:4-mixture of benzene and ethyl acetate and pure O-desacetyl-O-(N-ethyl-carbamoyl) - 7 - N - [N - carbo - tertiary butyloxy-D(—)-α-phenylglycyl]-amino - cephalosporanic acid obtained which in the thin-layer chromatogram on silica gel displays an Rƒ value of 0.55 in the system ethyl acetate: pyridine:glacial acetic acid:water (62:21:6:11) and Rƒ value of 0.52 in the system n-butanol:glacial acetic acid: water (67:10:23).

EXAMPLE 4

At 5° C. and with good stirring, 0.50 g. of O-desacetyl-O-(N-acetyl-carbamoyl)-7-N-[N - carbo - tertiarybutyloxy-D(—) - α - phenylglycyl] - amino-cephalosporanic acid are dissolved in 2.0 ml. of trifluoroacetic acid. When the evolution of gas has ceased (i.e. after a reaction period of about 3 minutes) the batch is poured into 30 ml. of cooled ether, and the voluminous, amorphous precipitate centrifuged off, washed four times with fresh ether, and dried in a high vacuum. In this manner, O-desacetyl-O-(N-acetyl-carbamoyl) - 7 - N - [D(—)-α-phenylglycyl]-amino-cephalosporanic acid-trifluoracetate is obtained.

1.5 g. of O-desacetyl-O-(N-acetyl-carbamoyl) - 7 - N [D(—)-α-phenylglycyl] - amino - cephalosporanic acid-trifluoracetate are dissolved in 40 ml. of methanol and 40 ml. of water and given a pH of 4.5 with 0.1 N 50% methanolic sodium hydroxide solution. Ethanol is added and the solution evaporated to dryness. The residue is digested with 10× 5 ml. of alcohol, dissolved in 40 ml. of methanol and 40 ml. of water, and the solution is treated with 400 mg. of Norit SX–LF. The solution is filtered through "Hyflo," the methanol expelled in a high vacuum, and the aqueous solution lyophilized. O-desacetyl-O-(N - acetyl - carbamoyl) - 7 - N - [D(—) - α-phenylglycyl]-amino-cephalosporanic acid is obtained as an inner salt of the formula

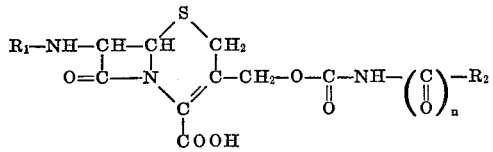

The O-desacetyl-O-(N-acetyl-carbamoyl)-7-N-[N-carbo-tertiary butyloxy-D(—) - α - phenylglycyl]amino-cephalosporanic acid used as starting material can be prepared as follows:

A solution of 11.3 g. (20 mmols) of the crude lyophilisate of the sodium salt of O-desacetyl-7-N[N-carbo-tertiary butyloxy-D-(—) - α - phenylglycyl] - amino-cepha- losporanic acid containing sodium acetate (cf. Example 1) in 200 ml. of absolute, degassed dimethylformamide containing 28 ml. (200 mmols) of absolute triethylamine, is treated with 15.6 ml. (200 mmols) of acetyl-isocyanate. The mixture is shaken at 25° C. for 30 minutes and then evaporated to dryness under a high vacuum. The residue is dissolved in 600 ml. of a 10% aqueous phopshate buffer (pH 6.7), given a pH of 2.5 with ethyl acetate, and extracted with 3× 300 ml. of ethyl acetate. The combined organic extracts are washed with water and saturated aqueous sodium chloride solution, dried over sodium sulfate, and evaporated under reduced pressure. The residue is chromatographed over the 30-fold quantity of silica gel (0.05–0.2 mm. grain size). Elution is performed with a 1:1 mixture of benzene and ethyl acetate, and pure O-desacetyl-O-(N-acetyl-carbamoyl)-7-N-[N-carbo-tertiary butyloxy-D(—)-α-phenylglycyl]-amino - cephalosporanic acid obtained.

We claim:

1. O-desacetyl-7-N-acyl-amino-cephalosporanic acid of the formula

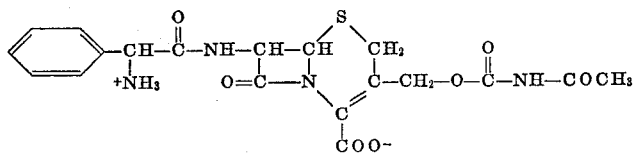

in which $R_1$ represents α-cyclic-substituted acetyl or β-cyclic-substituted propionyl in which each of said cyclic substituents is a member selected from the group consisting of cyclopentyl, cyclohexyl, phenyl, pyridyl, thienyl or furyl, unsubstituted or substituted by lower alkyl, hydroxy, lower alkoxy, trifluoromethyl, nitro or halogen, and in which the acetyl group contains amino in the α-position to the carbonyl group and the propionyl group contains amino in the β-position to the carbonyl group, $R_2$ stands for a lower alkyl group which is unsubstituted or substituted by halogen, $n$ stands for 0 or 1, or a salt thereof.

2. A compound as claimed in claim 1 of the formula

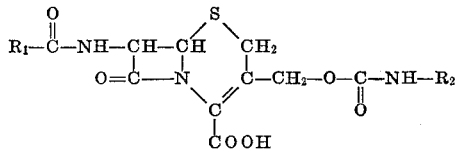

in which $R_1$ represents the α-aminobenzyl, β-amino-2-phenylethyl, α-amino-2-thienyl or α-aminocyclo-hexyl, and $R_2$ represents a lower alkyl group which is unsubstituted or substituted by chlorine, or a therapeutically acceptable salt thereof.

3. A compound as claimed in claim 2, in which $R_1$ represents α-aminobenzyl and $R_2$ represents β-chlorethyl, or a therapeutically acceptable salt thereof.

4. A compound as claimed in claim 2, in which $R_1$ represents α-aminobenzyl and $R_2$ represents ethyl, or a therapeutically acceptable salt thereof.

5. A compound as claimed in claim 2 in which $R_1$ represents α-aminobenzyl and $R_2$ represents methyl, or a therapeutically acceptable salt thereof.

6. A compound as claimed in claim 2, in which $R_1$ represents α-aminobenzyl and $R_2$ represents acetyl, or a therapeutically acceptable salt thereof.

References Cited

UNITED STATES PATENTS 3,518,260  6/1970  Spencer et al. _____ 260—243 C
3,484,437  12/1969  Urech et al. _____ 260—243 C NICHOLAS S. RIZZO, Primary Examiner U.S. Cl. X.R.

424—246

UNITED STATES PATENT OFFICE
CERTIFICATE OF CORRECTION

Patent No. 3,706,746          Dated December 19, 1972

Inventor(s) ROLF BOSSHARDT ET AL

It is certified that error appears in the above-identified patent and that said Letters Patent are hereby corrected as shown below:

Column 11, line 59, in the right-hand part of the formula delete

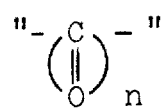

and insert  -- $-(\underset{\underset{O}{\|}}{C})_n-$ --

Signed and sealed this 19th day of February 1974.

(SEAL)
Attest:

EDWARD M. FLETCHER, JR.          C. MARSHALL DANN
Attesting Officer                Commissioner of Patents df